United States Patent
Schiekofer et al.

(10) Patent No.: US 12,346,099 B2
(45) Date of Patent: Jul. 1, 2025

(54) METHOD FOR TRANSFORMING A DATA MODEL FOR AUTOMATION PURPOSES INTO A TARGET ONTOLOGY

(71) Applicant: SIEMENS AKTIENGESELLSCHAFT, Munich (DE)

(72) Inventors: Rainer Schiekofer, Nuremberg (DE); Stephan Grimm, Munich (DE); Maja Milicic Brandt, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 553 days.

(21) Appl. No.: 17/295,429

(22) PCT Filed: Nov. 20, 2018

(86) PCT No.: PCT/EP2018/081938
§ 371 (c)(1),
(2) Date: May 19, 2021

(87) PCT Pub. No.: WO2020/104019
PCT Pub. Date: May 28, 2020

(65) Prior Publication Data
US 2021/0405624 A1    Dec. 30, 2021

(51) Int. Cl.
*G05B 19/418*    (2006.01)
*G06F 16/36*    (2019.01)

(52) U.S. Cl.
CPC ....... *G05B 19/4186* (2013.01); *G06F 16/367* (2019.01)

(58) Field of Classification Search
CPC ......... H04L 67/12; H04L 67/51; H04L 69/08; G06F 16/367; G06F 16/9024; H04W 4/70; G05B 2219/3426
See application file for complete search history.

(56) References Cited

U.S. PATENT DOCUMENTS

2016/0019294 A1    1/2016    Dong et al.
2016/0139886 A1    5/2016    Perdriau et al.
(Continued)

FOREIGN PATENT DOCUMENTS

CN    106202143 A    12/2016
CN    108459574 A    8/2018
(Continued)

OTHER PUBLICATIONS

Research on Semantic Extension Method of Real-time Data for OPC UA by Daoqu Geng (hereafter Geng), 2018 3rd International Conference on Materials Science, Machinery and Energy Engineering (MSMEE 2018), Pub. Date: Jul. 2018 (Year: 2018).*
(Continued)

*Primary Examiner* — Hau H Hoang
(74) *Attorney, Agent, or Firm* — Lempia Summerfield Katz LLC

(57) ABSTRACT

Providing data generally involves a transformation of an OPC UA data model into an ontology. Such an ontology readily provides desired capabilities for validation, querying, and analytics of the OPC UA data model using sophisticated standard tools adapted to the ontology. A method for transforming a semantically enriched and graph-based data model into a target ontology is suggested. By a first act, identifications of nodes are retrieved of the data model. Subsequently or concurrently, semantic descriptions of one or more references interconnecting one or more nodes are retrieved. These semantic descriptions are expressed by at least one or more predicates and one or more concepts (e.g., classes) in the target ontology to be produced. Eventually, the target ontology is structured by a semantic ontology language and output to a triple store.

7 Claims, 1 Drawing Sheet

(56) References Cited

U.S. PATENT DOCUMENTS

2016/0350364 A1    12/2016    Anicic et al.
2017/0083547 A1     3/2017    Tonkin et al.
2018/0121815 A1     5/2018    Lamparter et al.

FOREIGN PATENT DOCUMENTS

| FR | 3006473 A1 | 12/2014 |
| JP | 2016526231 A | 9/2016 |
| JP | 2017521748 A | 8/2017 |
| KR | 20190020399 A | 3/2019 |
| WO | 2016165923 A1 | 10/2016 |
| WO | 2018194222 A1 | 10/2018 |

OTHER PUBLICATIONS

Pessemier Wim: "Why Semantics Matter—OPC Connect"; Sep. 18, 2016; XP055947372; Retrieved from the Internet: bra href="URL:https" target="_blank"URL:https/a://web.archive.org/web/20160918201558/a href="http:I/opcconnect.opcfoundation.org/2015/12/why-semantics-matter/;" target="_blank"http:I/opcconnect.opcfoundation.org/2015/12/why-semantics-matter/;/a, pp. 1-12.

Graube, Markus, Leon Urbas, and Jan Hladik. "Integrating industrial middleware in linked data collaboration networks." 2016 IEEE 21st International Conference on Emerging Technologies and Factory Automation (ETFA). IEEE, 2016. pp. 1-8.

Masinter, Larry, Tim Berners-Lee, and Roy T. Fielding. "Uniform resource identifier (URI): Generic syntax." RFC 3986—Network Working Group: Fremont, CA, USA (2005). pp. 1-61.

PCT International Search Report and Written Opinion of International Searching Authority mailed Apr. 11, 2019 corresponding to PCT International Application No. PCT/EP2018/081938.

Schiekofer, Rainer, Andreas Scholz, and Michael Weyrich. "REST based OPC UA for the IIoT." 2018 IEEE 23rd International Conference on Emerging Technologies and Factory Automation (ETFA). vol. 1. IEEE, 2018. pp. 274-281.

Yang Haichao; "A Model of Ontology Relational Mapping Based on ORM"; Aug. 15, 2012. http://www.c-s-a.org.cn.

Geng, Daoqu et al., "Research on Semantic Extension Method of Real-time Data for OPC UA," 2018 3rd International Conference on Materials Science, Machinery and Energy Engineering, Jun. 29, 2018, pp. 102-110.

* cited by examiner

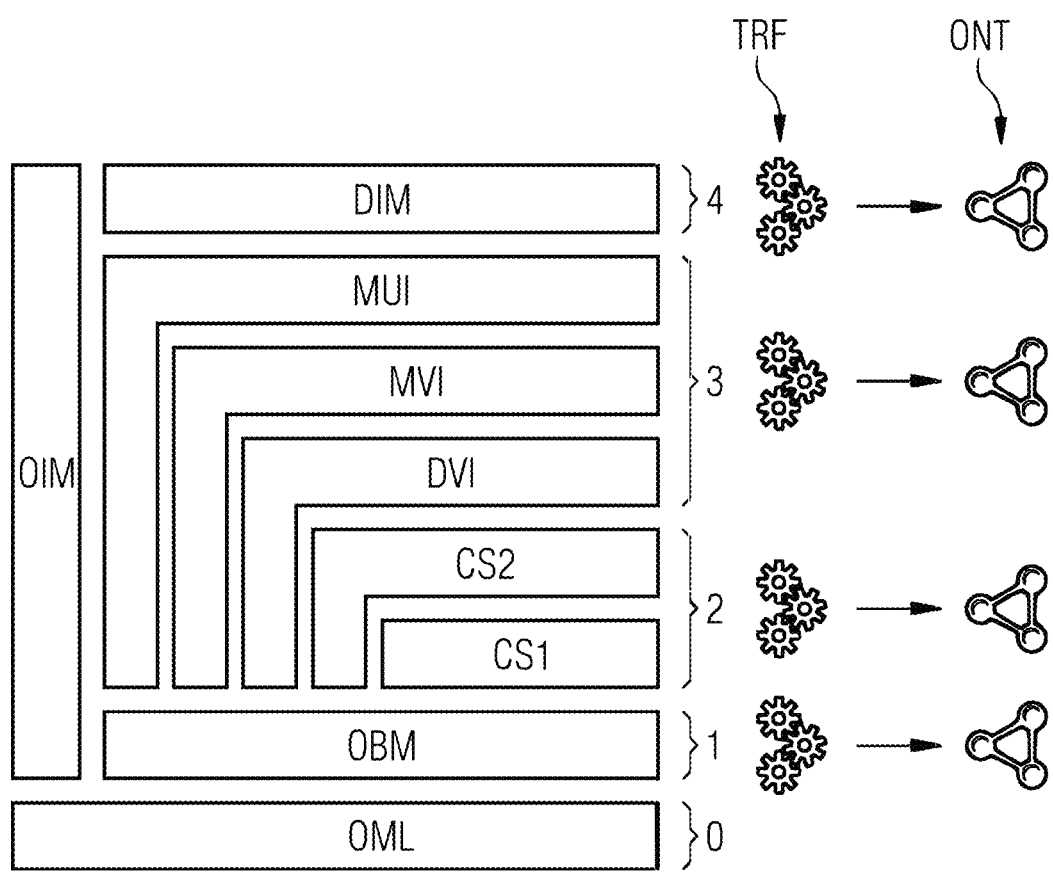

METHOD FOR TRANSFORMING A DATA MODEL FOR AUTOMATION PURPOSES INTO A TARGET ONTOLOGY

This application is the National Stage of International Application No. PCT/EP2018/081938, filed Nov. 20,2018. The entire contents of this document are hereby incorporated herein by reference.

TECHNICAL FIELD

The present embodiments relate to a method for transforming a data model for automation purposes into an ontology. More specifically, the present embodiments relate to a method for transforming a semantically enriched and graph-based data model dedicated for automation purposes into a target ontology.

BACKGROUND

Industrial automation system components of the past have traditionally been interconnected by specialized networks using standard industrial protocols for access and data exchange. The development of present and future automation systems has put considerable focus on exchanging semantically enriched information aiming for a realization of flexible manufacturing scenarios.

In order to overcome a still present low-level communication of signals in industrial automation systems, a protocol entitled OPC UA has been proposed for enhancing field-level communication to a semantic level. Open Platform Communications Unified Architecture (OPC UA) is an industrial standard protocol of the OPC Foundation for manufacturer-independent communication with the purpose of interchanging industrial data (e.g., in process automation).

A data model of OPC UA features a semantically enriched and graph-based data structure that is dedicated to automation purposes. However, OPC UA rather defines concepts for expressing semantic descriptions within the specification documents, which provides that a formal semantic representation is lacking. Accordingly, the usage of OPC UA suffers from significant drawbacks due to a lack of formal semantic representation: As a first drawback, data models of OPC UA cannot be validated completely automatically by computer systems since there is no ruleset for semantic descriptions that would allow for automatic processing by validation tools. Another issue that cannot be addressed without formal definition is the verification of the core OPC UA standard itself, which may also contain inconsistent statements. As a second drawback, querying within an OPC UA data model is intricate. Although OPC UA defines a query language for accessing the data model, no framework for implementing query requests exists to date, not least due to the high complexity imposed for querying the semantic descriptions scattered within the data model of OPC UA. As a third drawback, the lack of formal semantics in OPC UA impedes analytical processes for tasks like skill-matching, data mining, monitoring, etc.

SUMMARY AND DESCRIPTION

There is a need in the art to facilitate a validation, an analysis, or a query within semantically enriched graph-based data models (e.g., OPC UA) while unraveling the intricacies of scattered semantic descriptions within such data models.

The scope of the present invention is defined solely by the appended claims and is not affected to any degree by the statements within this summary.

One preliminary consideration according to the present embodiments in addressing existing problems with the considered data model is that the scattered nature of semantics within the model is to be altered in favor of a formal semantic representation.

Embodiments herein generally involve a transformation of the data model into an ontology that is understood as a formal semantic representation of terminology and concepts, as well as the relationships among those concepts. Ontologies readily provide the desired capabilities for validation, querying, and analytics of the data model using sophisticated standard tools adapted to the formal representation of the ontology.

In one embodiment, a computer-implemented method for transforming a semantically enriched and graph-based data model into a target ontology is suggested, where at least one layer of the data model is provided by a first memory unit. The data model includes a plurality of nodes described by attributes and interconnected by references. By a first act, identifications are retrieved from the nodes of the data model. Each identification is thereby expressed (e.g., replaced or amended) by a unique resource identifier (URI) conforming to a representational state transfer (REST) ruleset. Subsequently or concurrently, semantic descriptions of one or more references interconnecting one or more nodes are retrieved. These semantic descriptions are expressed (e.g., replaced or amended) by at least one predicate and/or at least one class in the target ontology to be produced. Eventually the target ontology is structured by a semantic ontology language and output to a triple store.

According to another embodiment, a transformation unit including a processor and a data storage device having stored thereon a computer executable program code is provided. The data storage device may be implemented within or external to the processor.

According to a further embodiment, a non-transitory computer-readable storage medium having stored thereon computer executable program code is provided.

BRIEF DESCRIPTION OF THE DRAWING

FIG. 1 shows a layered architectural framework in accordance with the modular structure of OPC UA.

DETAILED DESCRIPTION

Turning now to FIG. 1 showing a layered architectural framework in accordance with the modular structure of OPC UA. The OPC UA framework provides a layered structure as follows: On a Meta Layer 0, basic entities, e.g. node classes, attributes, references etc. are defined by an OPC UA Meta Layer OML. A most general OPC UA Core Model or OPC UA Base Layer OBM is provided by the OPC Foundation itself. The core model OBM includes specifications of base variable types, server types, engineering units, etc. on a Base Layer 1. In a Companion Layer 2 above, at least one OPC UA companion specification CS1, CS2 is used to define domain specific models or schemas extending the OPC UA model. A Lower Companion Specification CS1 may include a topology element type definition; an Upper Companion Specification CS2 may include stream type definitions or, more specifically, an axis type for a computer numerical control (CNC) machine. An Extension Layer 3 above is hosting original equipment manufacturer (OEM) specific schema extensions authored by OEMs, including, for example, a device vendor information (DVI) model including device type descriptions, a machine vendor information model (MVI) including machine type descriptions and a machine user information (MUI) model including process types or factory element types. Eventually, an Instance Layer 4 on the top of the layered model includes a device/asset information model (DIM) (e.g., an instance model for describing configuration and data items of individual devices based on schemas defined in the layers 0,1,2,3 below). An OPC UA information modelling (OIM) perpendicular to the layers 0,1,2,3,4 symbolizes the consistency in the OPC UA data model throughout all layers 0,1,2,3,4. An expressivity of information models generally increases from a lower layer to a higher layer.

In anticipation of embodiments to be described further below, a transformation process TRF for transforming the information models or data models within a respective layer 0,1,2,3,4 into a respective ontology ONT may be carried out in a likewise modular way, as shown in the drawing.

The embodiments may support providing one or more layers of a data model in order to be transformed to a respective ontology ONT. The transformation process TRF transforms OPC UA information models or data models by translating each of the modules on the respective layer into ontologies ONT that import each other in the same way as respective OPC UA modules. Once this transformation process TRF is performed, the resulting ontologies ONT may be used for the purpose of validation, querying, and analytics.

For validation purposes, the OPC UA graph as a graph-based data model is transformed to an RDF based target ontology that is then subjected to the validation using standard ontology tools instead of validating the graph-based data model. After this validation step, it is possible to check the consistency of the target ontology using conventional reasoners without additional effort for implementing validation algorithms. This approach will also support automatic rule updates through the declarative nature of a semantic ontology language used to build the target ontology. Referring to FIG. 1, this validation may be done on the base layer 1 to provide the consistency of the core specification itself, the companion layer 2 for validating newly developed companion specifications against the core specification, the extension layer 3 for validating vendor specific extensions against the underlying schemes, and the instance layer 4 for validating the instance model against a given schema. In order to enable full coverage of all OPC UA rules and also all rules that may be added by companion specifications, it may be necessary to combine a number of different reasoning technologies (e.g., OWL (Web Ontology Language), SHACL (Shapes Constraint Language), etc.)

For query purposes, the embodiments may support providing an easy access to OPC UA data model using the common query language SPARQL (SPARQL Protocol and RDF Query Language). The embodiments provide an RDF representation within the target ontology as an outcome, which captures OPC UA semantics in a formal way. Querying is typically occurring on the instance layer in order to find the requisite data points for other applications (e.g., monitoring, human machine interfaces, maintenance, etc.). However, queries may be used as well for introspection purpose on the extension layer 3 and the companion layer 2, and further on for validations on the base layer 1.

For supporting analytics, the embodiments may support gaining access to the semantics of OPC UA companion standards in a formal way. The formal access enables use cases such as skill matching, onboarding, monitoring, etc. This may be useful for the instance layer 4 in combination with the companion layer 2, where the companion layer 2 provides the standardized semantics for a given domain, and whereby the instance layer 4 provides specific values that are tagged by these semantics. Based on the companion layer 2, semantic interoperability may be achieved by widely accepted standardized vocabularies for a given domain. The formal OWL representation may also be used to interconnect different OPC UA Companion Specifications, to express the fact that two concepts from different domains mean the same (e.g., temperature), which is currently not standardized in OPC UA itself. The Extension-Layer may also be used for analytics and may be useful to easily import ontologies into OPC UA without the formal standardization process of the OPC Foundation. Such import of ontologies may be processed using existing ontologies such as schema.org or the semantic sensor network ontology.

In the following, the transformation process TRF for transforming the data models within a respective layer 0,1,2,3,4 into a respective target ontology ONT is disclosed in further details below.

According to a first act of the embodiments, identifications or NodeIDs of UPC UA nodes are retrieved, and each identification is expressed by a unique resource identifier (URI) conforming to a representational state transfer (REST) ruleset.

In the OPC UA data model, every entity in the address space is a Node. To uniquely identify a Node, each node has a NodeId including three elements (e.g., a NamespaceIndex, an IdentifierType, and an Identifier).

The NamespaceIndex is an index (e.g., a numeric value) used by an OPC UA server in online operation instead of a namespace identifier in order to expedite transfer and processing of data. The namespace identifier identifies a naming authority defining the identifiers of NodeIds, e.g. the OPC Foundation, other standard bodies and consortia, the underlying system, or the local server. The NamespaceIndex is stored in a repository along with a respective namespace identifier or namespace uniform resource identification (URI). This repository within OPC UA is also referred to as namespace array. The IdentifierType defines a data type of the identifier (e.g., a numeric value, a string, etc.). The Identifier, eventually, identifies the Node in the address space of an OPC UA server.

Although the OPC UA specifications endorse a system-wide and globally unique identifiers (NodeId), there are cases where more than one Node has a common identifier (e.g., DisplayName, Description). The retrieval of identifications may, therefore, optionally be accompanied by a retrieval of a browse name or »BrowseName« for each OPC UA node in order to unambiguously map distinct semantics having a common name. In general, however, OPC UA allows multiple nodes sharing a same browse name. Whereas the BrowseName according to OPC UA cannot be used to unambiguously identify a node in all cases, as different nodes may have the same BrowseName, a namespace of the BrowseName may provide to make the BrowseName unique in some cases in the context of a Node (e.g., some properties of a node).

An exemplary identification of a node (based on the NodeId) is structured as follows:

NamespaceString/i=1:11111111111

Wherein »NamespaceString« is a string expressing the namespace identifier. The string is gathered from the NamespaceArray based on the NamespaceIndex, here with a numerical value of 1 (one) of the NodeId. The NamespaceString is required to end with slash or »/«. The NodeId is composed as described further below. The NamespaceIndex i is set to 1 because this is the index for the local server that has to be equal with the NamespaceString. An exception is a NamespaceIndex with a value of zero or »0«, indicating that this Node is part of the OPC UA base model OBM. However, it is only allowed to omit the corresponding NamespaceArray if the »NamespaceString« is equal to index 1 of the NamespaceArray.

A further exemplary identification of a node including a qualified name is structured as follows:
NamespaceString/QualifiedName.name
Wherein »QualifiedName« is a data structure with two parts: namespaceindex and name. The NamespaceString is based on the corresponding entry of the NamespaceArray, e.g., http://opcfoundation.org/UA/ServerType)

A further exemplary identification of a node including a query is structured as follows:
<host>/i=1:11111111111/
QualifiedNameString?ns=NamespaceStringArray
Wherein the sequence »?ns=NamespaceStringArray« designates a query for the Namespace in the NamespaceArray. In this case, the NamespaceString is based on the query argument »?ns=NamespaceStringArray«, where the first entry in the query argument stands for the NamespaceIndex 1.

Such OPC UA identifications of a Node as shown above are to be expressed by a URI conforming to a REST or Representational State Transfer ruleset. Representational State Transfer, or REST, is a software architectural style defining a set of constraints to be used for creating web services. One of the constraints of REST is a uniform identification of resources of URIs, e.g. according to the suggestion RFC 3986 (»Requests for Comments«) of the Internet Engineering Task Force (IETF).

An exemplary generic example of a URI according to RFC 3986 is structured as follows:
https://example.com:8042/over/there?name=gear#shaft
wherein the sequence »https« designates a scheme, the sequence »example.com:8042« designates an authority, the sequence »/over/there« designates a path, the sequence »?name=gear« designates a query, and the sequence »shaft« designates a fragment.

An example specific for an OPC UA contest of a URI according to RFC 3986 is structured as follows:
https://example.com:8042/vendorSpecific/V1.04/11111/i=111111111?qKey=qValue
wherein the sequence »https« designates a scheme, the sequence »example.com:8042« designates an authority, the sequence »/vendorSpecific« designates a path prefix, the sequence »/V1.04« designates version of the application programming interface (API) or apiVersion, which is usually set by the OPC Foundation. The optional sequence »/11111« designates a version of the URI or uriVersion being property value of the OPC UA server. The string including the latter three sequences »/vendorSpecific/V1.04/11111/i=111111111« is referred to as path. Finally, the sequence »?qKey=qValue« designates a query for a queried value qValue within a key qKey.

In order to identify the sequences, a parser is applied with the following rules:
1. Find query delimiter (First "?") and split URI into Path and Query
2. Split Path in PathElements (delimiter "/")
3. Check if the first PathElement is a NodeId (true if a "=" is present)
   a. If a "=" is present:
      i. Check the NodeIdType (first char on the left side of "=")
      ii. Decode server index on the left side of the NodeIdType Identifier (first char on the left side of "=")
      iii. Split NodeIdValue (right side of "=")
         1. Split NodeIdValue in Namespace (left side) and Identifier (right side) (delimiter=":");
         2. Decode identifier based on NodeIdType
   b. If no "=" is present:
      i. Split BrowseName in Namespace (left side) and Value (right side) delimiter=":")
      ii. Decode Value Part of BrowseName
4. Split BrowseName in Namespace (left side) and Value (right side) (delimiter=":")
   a. Decode Value Part of BrowseName
5. Check if the last BrowseName is an attribute BrowseName
6. Split QueryArgs
   a. Find next "="; Left side is the key;
   b. Find next "&"; Left side is the value;
      i. Split array elements (delimiter ",")
         1. Decode each element Although it is desirable to not only infer machine-readable but also human-readable URIs, the latter of which may be used later for easy addressing, this aim is based on the assumption that BrowseNames of Types are unique. To be more concrete, it would not be allowed to define two Types with the same BrowseName. However, such a restriction is not generally required within OPC UA and cannot be guaranteed in each case. At least this uniqueness is considered as a good model practice.

If this assumption does not hold, the NodeId shall be used instead of the BrowseName. Further on, StructureFieldNames and InstanceDeclarationBrowseNames should have similar restrictions. However, in this case, the BrowseName may be reused a number of times, but the meaning should always be the same. For example, it should be avoided to define two InstanceDeclarations with the BrowseName:
http://myNamespace.org/sensorValue
where in one case a temperature and in another case a pressure is addressed while a difference between these sensor values may only be interpreted by a human through reading the different description attributes of the different InstanceDeclarations.

In both cases, it is more appropriate to use a more specific BrowseName, e.g.
http://myNamespace.org/temperature
and
http://myNamespace.org/pressure A fallback solution is to use the NodeId of the InstanceDeclaration instead of the BrowseName. In general, the following conditions for reused BrowseNames should be considered: The DescriptionName and DisplayName attributes are the same. This is a default check for generator tools anyway. The semantics of different InstanceDeclarations are the same. A human would assume both InstanceDeclarations address the same thing (e.g., a temperature value) in cases where the DescriptionName or DisplayName attributes differ. The DataType, ModellingRule, NodeClass, TypeDefinition and ReferenceType are allowed to be changed as long as the semantics of the BrowseName still apply. For example, in one case, the temperature is exposed as simple variable, where in the other case, a complex variable is used. However, typically, one should consider using different BrowseNames if these concepts are to be changed.

In summary, the first act of the embodiments for retrieving NodeIDs, and, optionally, browse names, and expressing these by a URI conforming to a REST ruleset provides simply accessibility by web-clients conforming to a REST architecture style. Beyond this, the URIs are provided in a format that is literally readable for humans. This readability may be improving a user experience when applying ontology editor and knowledge management system tools such as SPARQL and Protégé.

Protégé is a free, open source ontology featuring a graphic user interface for defining and amending ontologies. Protégé includes deductive classifiers for validating a consistency and for inferring new information based on the analysis of an ontology.

According to a second act of the embodiments, semantic descriptions of references between nodes are retrieved for expressing the semantic descriptions by at least one predicate and/or at least one class of the target ontology.

A predicate is part of a semantic triple, which is an atomic data entry of an ontology organized by a data model in a resource description framework (RDF) according to specifications of the World Wide Web Consortium (W3C). A triple is a set of three entities that codifies a statement about semantic data in the form of subject-predicate-object expressions. Triples are usually organized and stored in a database entitled triple store.

While the first act of the embodiment refers to a mapping of node identifications, the second act aims for mapping semantic descriptions to one or more predicates of the ontology. Mapping specifically provides applying rules for retrieving or parsing semantic descriptions scattered within the data model of OPC UA, classifying these semantic descriptions with common concepts, and subsuming the classified concepts to a formal data representation in a semantic ontology language.

A preferred semantic ontology language, amongst other semantic ontology language as RDF, RDFS or RDF schema, is provided by a language family referred to as OWL or Web Ontology Language. The OWL language family is structured in conformance with the XML standard of W3C for objects according to the Resource Description Framework or RDF. OWL in combination with RDF has a wide dissemination in implementing knowledge representation for authoring ontologies.

In the following, compound names with one or more medial capitals (e.g., a compound name »TypeDefinitionNodes«) are used to refer to authoritative names used in the specification »OPC Unified Architecture« of the OPC Foundation or in the OWL specification. These authoritative names are assumed to be known and for a person skilled in the art. Hereinafter, these authoritative names are, therefore, introduced without explanation.

The following OPC UA references include suitable semantic descriptions to be expressed by, or mapped to, at least one predicate of the target ontology:
TypeDefinitionNodes (VariableType, ObjectType)
InstanceDeclarations
BrowseNames and other attributes
ReferenceType
Structure of the address space (e.g., views)
DataTypes (e.g., Structure-DataType)

The following section defines how OPC UA semantics are transformed to an ontology or OWL class concept. The following ontology class concepts of OWL have appropriate counterparts within semantics of OPC UA suitable for mapping:
The class concept »Base« is derived from the BaseNode-Class of OPC UA and the super type of each concrete instance NodeClass.

The class concept »DataType« is identical to the DataType hierarchy, which may be found under Root/Types/DataTypes.

The class concept »InstanceDeclaration« is a helper concept to add the corresponding validation rules to this concept.

The class concept »MethodType« is a helper class to cover and tag all method semantics. The semantics may be captured based on the ObjectType and the BrowseName of the Method.

The class concept »ObjectType« is identical to the ObjectType hierarchy, which may be found under Root/Types/ObjectTypes. However, also object related InstanceDeclarations may be found in this hierarchy.

The class concept »ValueRankHelper« is a helper concept to add the corresponding validation rules to this concept.

The class concept »VariableType« is identical to the VariableType hierarchy, which may be found under Root/Types/VariableTypes. However, also Variable-InstanceDeclarations may be found in this hierarchy.

The class concept »InstanceDeclaration« includes the sub classes MethodInstanceDeclaration, ObjectInstanceDeclaration and VariableInstanceDeclaration. The restrictions regarding instances of InstanceDeclarations in the OPC UA specifications, part 3, chapter 6.3.6 are modelled using the OWL-Classes and the Subclass-Concept in combination with OWL DataProperty restrictions.

The class concept »DataType« is built using restrictions on DataTypes in combination with OPC UA variables and OPC UA variable types or VariableTypes. The »DataType« class concept is structured using OWL classes and the OWL subclass Concept in combination with OWL object property restrictions and the OWL union concept in order to structure the DataType field semantics, further including restrictions on the structure of DataType-Field constraints, like a data type. An exemplary data type is a 32 bit long unsigned integer or UInt32.

The class concept »MethodType« is the top-level-concept for all InstanceDeclaration-Methods. The semantic definition of methods is comparable to properties. Typical methods are defined by the »owning Object« and the assigned BrowseName. The following rules are to be applied for structuring the MethodType concept:
Try to map all method Nodes with the same BrowseName to one concept, regardless of the owning object. This rule is similar to the property BrowseNames; however, if this mapping is not possible, disjunctive concepts are to be introduced.
For validation purposes, subtypes under the class concept »MethodType« are introduced, the subtypes are based on a placeholder modelling rule.

The class concept »ObjectType« is used to capture the semantics of the OPC UA concept and to assign restrictions of the corresponding InstanceDeclaration and ModellingRules. An ObjectType consists of Annotation Properties including labels, comments, etc. The class concept in the ontology is modelled using OWL classes and the OWL-Subclass-Concept in combination with OWL DataProperty restrictions and OWL AnnotationProperties. The OWL DataProperty restrictions are modeled according to rules formalized in the OPC UA specification in part 3 of the specification.

By the class concept »ValueRankHelper«, restrictions regarding an attribute ValueRank of OPC UA Nodes are modelled according to OPC UA part 3, sections 5.6.5 and 6.2.7 using the OWL classes and the OWL subclass concept in combination with OWL DataProperty restrictions. One exemplary constraint according to OPC UA part 3, section 6.2.7 c) reads as: The ArrayDimensions Attribute may be added if it was not provided or when modifying the value of an entry in the array from 0 to a different value. All other values in the array shall remain the same.

This constraint is mapped to a regular expression or RegEx-pattern, as for example:
arrayDimensions some xsd:string[pattern "\\[1,[0-9]{0,3}, 1\\]"]"

The class concept »VariableType« is used to capture the semantics of the OPC UA concept and to assign restrictions of the corresponding InstanceDeclaration and ModellingRules. A VariableType consists of Annotation Properties including labels, comments, etc. The class concept in the ontology is modelled using OWL classes and the OWL-Subclass-Concept in combination with OWL DataProperty restrictions, OWL ObjectProperty restrictions, and OWL AnnotationProperties. The OWL DataProperty restrictions are modeled according to the rules formalized in the OPC UA specification in part 3 of the specification.

Properties are modeled in the ontology by the following mapping rule. Definitions of Properties and corresponding BrowseNames (e.g., a Property BrowseName) are introduced as a subconcept of the PropertyType for each unique Property-BrowseName. This general mapping rule will provide that Properties with equal BrowseNames will also be mapped to the corresponding Property-BrowseName concept.

The top-level object property »objectProperties« may be used to enforce sameIndividual inferences. This concept has no other semantics assigned to it.

As to the BrowseName of InstanceDeclarations and StructureFieldName concept, each BrowseName of an InstanceDeclaration is to be mapped to an object property. Each StructureFieldName is to be mapped to an object property with the namespace of the Structure-DataType-Namespace and the string-part with the FieldName. The description of the Structure-DataType-Field may be mapped to an rdfs:comment annotation.

As to the ReferenceType concept, ReferenceTypes in OPC UA are to be mapped to object properties in the ontology. All references that are not symmetric are to have an »inverse« counterpart. Based on the »InverseOf« axiom, a reasoner may automatically infer bidirectional references without the need of explicit modelling. If the InverseName attribute is specified, the attribute is used for naming the concept. If an InverseName attribute is not specified, a ReferenceName with the prefix »inverse« Is to be used (e.g., inverseHierarchicalReferences). In order to provide a reliable inference of the inverse references, the Hierarchical-References tree is to be completely mirrored. If a ReferenceType is defined as symmetric and hierarchical, the reference is to be a subtype of the forward and the inverse tree. Symmetric references (e.g., Symmetric-Attribute is set to true) will also be reflected by setting a SymmetricObjectProperty to true.

The present embodiments allow using already existing semantic web reasoning tools for validation of OPC UA information models. Another advantage is the fact that through the declarative nature of web ontology languages, specifically OWL, newly added rules may be processed without modifying the code base.

The present embodiments enable querying an OPC UA data model. Currently, there is no product-ready tool implementation for querying an OPC UA data model available. By using a mapping according to the embodiments for generating an ontology including RDF triples required by a SPARQL engine, querying of the OPC UA data models becomes feasible. Merely generating triples based on OPC UA nodes, however, would not be sufficient. The present embodiments provide a method where the triples are generated such that the semantics of OPC UA are captured, offering possibilities to reduce the effort for formulating queries by a huge magnitude. Based on the mapping of the present embodiments, semantic Web experts as well as OPC UA experts are able to formulate queries.

The present embodiments further enable analyzing the OPC UA data model. Based on the formal representation of OPC UA semantics, it is now possible to do tasks like skill-matching, onboarding of devices into machinery, data-Mining, etc.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for transforming a semantically enriched and graph-based data model for automation purposes into a target ontology, the method comprising:
providing at least one layer of the semantically enriched and graph-based data model from a first memory unit, the semantically enriched and graph-based data model including a plurality of nodes described by attributes and interconnected by references;
retrieving identifications, browse names, or the identifications and the browse names of the plurality of nodes, expressing each identification by a unique resource identifier (URI) conforming to a Representational State Transfer (REST) ruleset;
retrieving semantic descriptions of the references and expressing the semantic descriptions by at least one predicate, at least one class of the target ontology, or the at least one predicate and the at least one class of the target ontology for mapping the semantic descriptions to the at least one predicate, the at least one class of the target ontology, or the at least one predicate and the at least one class of the target ontology; and
structuring the target ontology by a semantic ontology language and outputting the target ontology to a triple store,
wherein expressing the semantic descriptions by the at least one predicate, the at least one class of the target ontology, or the at least one predicate and the at least one class of the target ontology comprises expressing the semantic descriptions by the at least one predicate and the at least one class of the target ontology.

2. The method of claim 1, wherein the semantically enriched and graph-based data model for automation purposes is an OPC UA data model.

3. The of claim 1, wherein the semantic ontology language is an RDF schema, an OWL, or an RDFS.

4. The method of claim 1, wherein the URI is uniquely expressed for different instance declarations within the target ontology further using a browse name, a display name, a description attribute, or any combination thereof.

5. The method of claim 1, wherein expressing the semantic descriptions by the at least one predicate, the at least one class of the target ontology, or the combination thereof includes parsing semantic descriptions within the semantically enriched and graph-based data model, classifying the semantic descriptions with common concepts, and subsuming the classified concepts to a formal data representation within the semantic ontology language.

6. A transformation unit comprising:
a physical processor; and
a non-transitory computer-readable storage medium having stored thereon computer executable program code that, when executed by the physical processor, causes the physical processor to:
load at least one layer of a semantically enriched and graph-based data model for automation purposes from a first memory unit, the semantically enriched and graph-based data model including a plurality of nodes described by attributes and interconnected by references;
retrieve identifications, browse names, or the identifications and the browse names of the plurality of nodes, express each identification by a unique resource identifier (URI) conforming to a Representational State Transfer (REST) ruleset;
retrieve semantic descriptions of the references and express the semantic descriptions by at least one predicate, at least one class of a target ontology, or the at least one predicate and the at least one class of the target ontology for mapping the semantic descriptions to the at least one predicate, the at least one class of the target ontology, or the at least one predicate and the at least one class of the target ontology; and
structure the target ontology by a semantic ontology language and output the target ontology to a triple store,
wherein the expression of the semantic descriptions by the at least one predicate, the at least one class of the target ontology, or the at least one predicate and the at least one class of the target ontology comprises expression of the semantic descriptions by the at least one predicate and the at least one class of the target ontology.

7. A non-transitory computer-readable storage medium having stored thereon computer executable program code that, when executed by a computer, causes the computer to:
load at least one layer of a semantically enriched and graph-based data model for automation purposes from a first memory unit, the semantically enriched and graph-based data model including a plurality of nodes described by attributes and interconnected by references;
retrieve identifications, browse names, or the identifications and the browse names of the plurality of nodes, express each identification by a unique resource identifier (URI) conforming to a Representational State Transfer (REST) ruleset;
retrieve semantic descriptions of the references and express the semantic descriptions by at least one predicate, at least one class of a target ontology, or the at least one predicate and the at least one class of the target ontology for mapping the semantic descriptions to the at least one predicate, the at least one class of the target ontology, or the at least one predicate and the at least one class of the target ontology; and
structure the target ontology by a semantic ontology language and output the target ontology to a triple store,
wherein expressing the semantic descriptions by the at least one predicate, the at least one class of the target ontology, or the at least one predicate and the at least one class of the target ontology comprises expressing the semantic descriptions by the at least one predicate and the at least one class of the target ontology.

* * * * *